April 14, 1931.   G. C. HENDERSON   1,801,001
MONORAIL TROLLEY
Filed April 9, 1930
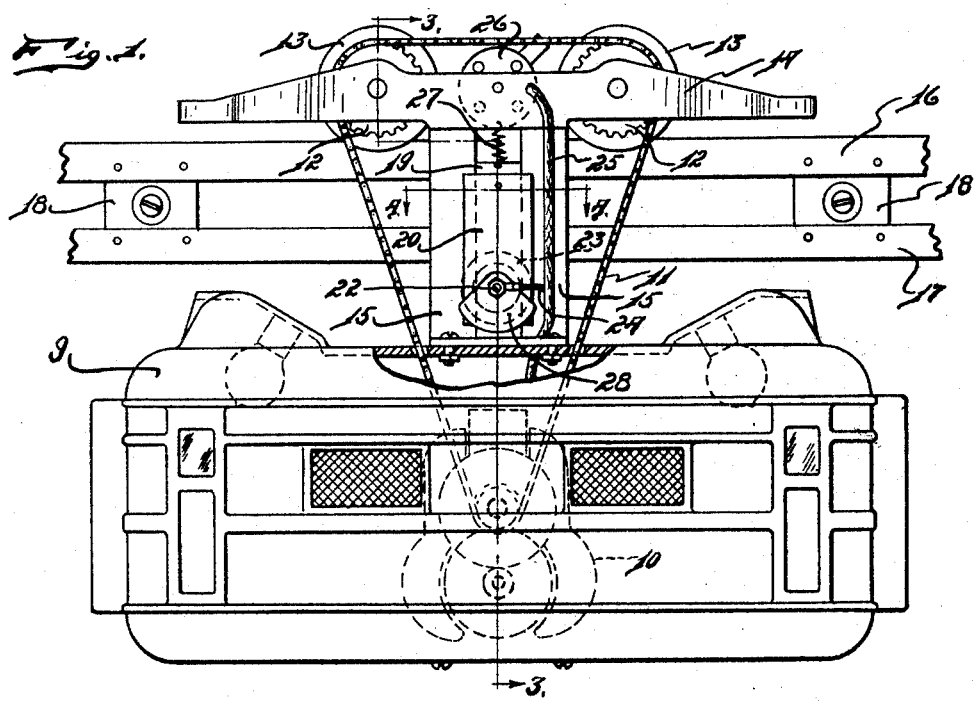
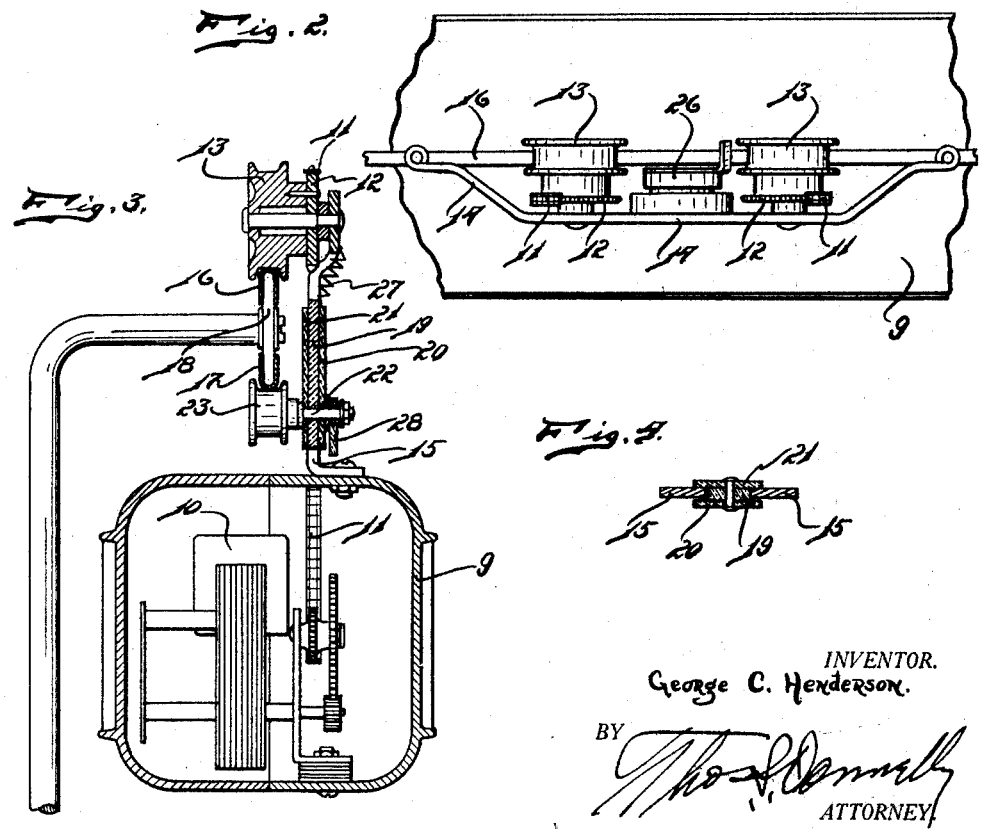
INVENTOR.
George C. Henderson.
BY
ATTORNEY Patented Apr. 14, 1931

1,801,001

UNITED STATES PATENT OFFICE

GEORGE C. HENDERSON, OF DETROIT, MICHIGAN

MONORAIL TROLLEY

Application filed April 9, 1930. Serial No. 442,956.

My invention relates to a new and useful improvement in a mono rail trolley and has for its object a provision in a mono rail traction system whereby the traction rail is in vertical alignment with the said rail of a trolley, engageable with the feed rail and so arranged and constructed as to ride in engagement therewith and particularly remain in engagement therewith when rounding curves and making turns.

It is another object of the present invention to provide a mono-rail trolley whereby the trolley wheel may be securely held in position with the mono rail and at the same time a flexibility given to its mountings which will assure maximum efficiency and durability.

Another object of the invention is the provision in a mono rail traction system of a trolley engageable with the feed rail and held yieldably in engagement therewith and also provided with a locking device which will prevent its undue removal therefrom.

Another object of the present invention is the provision in a mono rail trolley of a mounting for the trolley wheel which will lock the wheel in engagement with the trolley rail and which may be easily and quickly moved to position to release the trolley wheel from the rail.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention.

Fig. 2 is a view taken on line 2—2 of Fig. 1.
Fig. 3 is a view taken on line 3—3 of Fig. 1.
Fig. 4 is a view taken on line 4—4 of Fig. 1.

In the drawings I have illustrated the invention used with a mono rail traction system in which the car 9 contains the motor 10 which drives, through the chain 11 and the gear 12, the traction wheels 13 which are mounted in the frame 14 secured by the hangers 15 to the car body 9. These traction wheels engage the traction rail 16 which is positioned above and in alignment with the trolley rail 17. These rails are secured together at intervals by the spacing blocks 18. Slidably mounted between the hangers 15 is a plate 19 of insulating material secured to opposite sides of which are the retaining plates 20 and 21 which overlap each of the hangers 15 and serve to mount the plate 19 slidably between the hangers 15. Journaled in the plate 19 and projecting through the retaining plates 20 and 21 is a shaft 22 on which is rotatably mounted the trolley wheel 23 which engages the undersurface of the trolley rail 17. An electric cable 24 is connected to the shaft 22 and conducted through the cable 25 through a suitable switch mechanism 26 and thence to the motor 10. Attached to the upper end of the plate 19 is a coil spring 27 the opposite end of which is secured to the bolster 14 so as to normally retain the wheel 23 in engagement with the rail 17. Swingably mounted on the wheel 22 is a segment 28 also made of insulating material.

As shown in Fig. 1 and Fig. 3, the plate 19 may slide downwardly against the tension of the spring 27 a slight distance but this downward movement is insufficient to permit the clearing of the flanges of the trolley wheel with the rail so that disengagement of the trolley wheel with the rail cannot be had. When it is desired to disengage the trolley wheel from the rail, the segment guard 28 may be swung upwardly on the wheel 22 and then the plate 19 may be moved downwardly sufficiently to permit the disengagement.

With this arrangement of the feed rail and trolley mounting, the jumping of the trolley from the feed rail on mono rail systems when the car is making turns or round curves is prevented. At the same time a close engagement of the trolley with the rail is maintained, thus assuring efficient operation at all times.

While I have illustrated and described the preferred form of my invention, I do not wish to limit myself to the precise details of structure shown but desire to avail myself of such variations and modifications as may come within the scope of the appended claims.

Having thus described my invention what I claim as new, and desire to secure by Letters Patent is:

1. A mono rail trolley of the class described, comprising: a trolley wheel engageable with a trolley rail; resilient means for normally retaining said trolley wheel in engagement with said trolley rail; and means for limiting withdrawal of said trolley wheel from said trolley rail against the tension of said resilient means to a pre-determined distance.

2. A mono rail trolley of the class described, comprising: a trolley wheel engageable with a trolley rail; slidable means for supporting said trolley wheel; resilient means for resisting slidable movement of said slidable means in one direction; and means for preventing slidable movement of said slidable means in said direction beyond a predetermined distance.

3. A mono rail trolley of the class described, comprising: a trolley wheel engageable with a trolley rail; yieldable means for normally retaining said trolley wheel in engagement with said trolley rail; movable means adapted upon movement into one position for preventing withdrawal of said trolley wheel from said trolley rail beyond a pre-determined distance, said trolley wheel being adapted for movement away from said trolley rail a greater distance upon movement of said preventing means into another position.

4. A mono rail trolley of the class described, comprising: a trolley wheel engageable with a trolley rail; slidable means for supporting said trolley wheel in position; resilient means for normally resisting movement of said slidable means to withdraw said wheel from said rail; and movable means adapted, upon movement into one position, for preventing withdrawal of said trolley wheel from said rail beyond a pre-determined distance.

5. A mono rail trolley of the class described, comprising: a pair of spaced hangers; a plate slidably mounted between said hangers; a pair of retaining plates engaging opposite faces of said plate, and projecting beyond the sides thereof and embracing said hangers; a shaft journaled in and projecting through said first mentioned plate and said retaining plates; a trolley wheel mounted on said shaft and engageable with a trolley rail; a spring for resisting slidable movement of said plate in one direction; and means movably mounted on said shaft for, when moved to one position, preventing slidable movement of said plate in said direction beyond a predetermined distance.

In testimony whereof I have signed the foregoing specification.

GEORGE C. HENDERSON.